(12) United States Patent
Smith

(10) Patent No.: US 7,250,149 B1
(45) Date of Patent: Jul. 31, 2007

(54) SULFUR GAS TREATMENT PROCESS

(76) Inventor: Strom W. Smith, P.O. Box 380, Gulfport, MS (US) 39502

( * ) Notice: Subject to any disclaimer, the term of this patent is extended or adjusted under 35 U.S.C. 154(b) by 605 days.

(21) Appl. No.: 10/785,907

(22) Filed: Feb. 24, 2004

(51) Int. Cl.
*B01D 53/58* (2006.01)
*C01B 17/04* (2006.01)
*G05D 7/00* (2006.01)

(52) U.S. Cl. .............. 423/573.1; 423/237; 423/574.1; 423/576; 423/576.2; 423/576.8; 423/DIG. 5; 422/105; 422/111

(58) Field of Classification Search ........... 423/237, 423/573.1, 574.1, 576, 576.2, 576.8, DIG. 5; 422/105, 111
See application file for complete search history.

(56) References Cited

U.S. PATENT DOCUMENTS

| | | | |
|---|---|---|---|
| 4,405,593 A * | 9/1983 | Schlauer et al. | 423/574.1 |
| 5,021,232 A | 6/1991 | Hise et al. | |
| 5,741,469 A | 4/1998 | Bhore et al. | |
| 6,610,264 B1 | 8/2003 | Buchanan et al. | |
| 6,902,713 B1 * | 6/2005 | Binoist et al. | 423/237 |
| 7,067,101 B2 * | 6/2006 | Rameshni | 423/574.1 |
| 2003/0082096 A1 | 5/2003 | Lynn | |

* cited by examiner

*Primary Examiner*—Timothy C. Vanoy
(74) *Attorney, Agent, or Firm*—Keeling Patents and Trademarks L.L.C.

(57) ABSTRACT

The present invention comprises a method of treating an off-gas stream from a refining process to remove sulfur compounds. A portion of the off-gas stream containing hydrogen sulfide is injected at the front end of the thermal reactor and in at least one other location downstream of the thermal reactor. A ratio of hydrogen sulfide to sulfur dioxide at the outlet of the thermal reactor is less than the stoichiometric requirement. The ratio is adjusted downstream of the thermal reactor so that a ratio of hydrogen sulfide to sulfur dioxide is maintained substantially in excess of the stoichiometric requirement for a Claus reaction. The tail gas, containing hydrogen sulfide but virtually no sulfur dioxide, is treated by a process including removal of water and introducing sulfur dioxide into the tail gas in a stoichiometricly balanced quantity and processing the tail gas in a Claus reactor.

36 Claims, 5 Drawing Sheets

SULFUR GAS TREATMENT PROCESS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is generally related to processes for sulfur recovery and more specifically to processes for removing sulfur compounds, including hydrogen sulfide and sulfur dioxide, from process streams.

2. Description of the Related Art

Processing of hydrocarbon-containing fuels such as gasoline and diesel fuel results in gases containing sulfur compounds, including hydrogen sulfide ($H_2S$), and hydrocarbon compounds, including ammonia ($NH_3$). Governmental regulations limit plant emissions of sulfur-bearing gases. Refineries commonly include sulfur reduction units to decrease emissions of sulfur compounds.

The use of a Claus reaction to recover sulfur from process off-gases is widely known in the field. Sulfur dioxide ($SO_2$) and hydrogen sulfide react to produce elemental sulfur ($S_2$) and steam ($H_2O$). The reaction formula is:

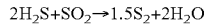

$$2H_2S + SO_2 \rightarrow 1.5S_2 + 2H_2O$$

The reaction can occur with or without a catalyst. As long as two moles of hydrogen sulfide are available for each mole of sulfur dioxide in appropriate concentrations with appropriate heat and pressure, elemental sulfur and water will result.

A typical prior art arrangement of a Claus process with a SCOT tail gas process is outlined in FIG. 5. The prior art generally teaches high temperature reaction of air, through air line 16, off-gas streams containing hydrogen sulfide, through hydrogen sulfide line 18, and off-gas streams containing ammonia, through ammonia line 12, in a thermal reactor 14 to oxidize a portion of the hydrogen sulfide in the process streams to create sulfur dioxide and to react the sulfur dioxide with hydrogen sulfide into elemental sulfur and water, thus eliminating a substantial portion of the hydrogen sulfide and sulfur dioxide in the streams. The quantity of air to the thermal reactor is controlled to provide a stoichiometric balance of hydrogen sulfide and sulfur dioxide in the process stream. A balanced stoichiometric ratio is difficult to maintain due to variations in composition of process streams.

Commonly, the process stream containing significant hydrogen sulfide is divided prior to introduction to the reactor chamber, with approximately 30-70% of the feed directed to the front end 22 of the thermal reactor chamber 14 through line 18 and the remaining 30-70% directed to the back end 20 of the reactor chamber 14 through line 18a. The mixture of air and off-stream gases is thermally reacted near the front end 22 of the reactor chamber 14 and moves to the back end 20 of the reactor chamber 14 where the second hydrogen sulfide stream is received.

It is desirable to maintain a temperature at or near 1,316° C. (2,400° F.) in the thermal reactor 14 to crack process gas hydrocarbon compounds such as ammonia. Providing a determined quantity of hydrogen sulfide at the front end 22 of the reactor chamber 14 assists in maintaining desired temperature in the thermal reactor 14. An excess of hydrogen sulfide tends to lower the temperature in the reactor chamber 14 due to increased mass flow. In prior art thermal reactors, the temperature at the back end 20 of the reactor 14 may be less than the desired temperature because of added off-gases containing hydrogen sulfide.

After the thermal reactor 14 the resulting gas stream is processed through a series of Claus reactors 46, 60 and 72, condensers 34, 50, 64 and 76 and reheaters 42, 54 and 68. The Claus reactors 46, 60 and 72 typically have aluminum oxide or bauxite catalyst beds. The Claus reaction produces elemental sulfur, which is recovered as liquid sulfur and water vapor. Traditional Claus systems remove greater than 95% of the sulfur from the process stream. Tail gas processes are used to remove remaining quantities of sulfur compounds to obtain an overall recovery of up to 99.9%.

Various processes are taught for treating tail gas to remove the remaining hydrogen sulfide and sulfur dioxide. The Shell Claus Off-gas Treating process, often referred to as the SCOT process, reacts hydrogen with remaining sulfur dioxide to generate hydrogen sulfide which is in turn absorbed in an amine compound. A typical SCOT process includes a pre-heater 82 for heating the tail gas, a hydrogenation reactor 84, a quench tower 86 to remove water from the tail gas, an amine tower 88 for reaction of the amine solution with the tail gas, a regenerator 96 to strip the hydrogen sulfide for transmission back to the Claus reactor, and an incinerator 92 for burning off treated tail gas. The SCOT process is effective in further reducing sulfur dioxide emissions. However, the SCOT involves substantial capital and operating expense. The hydrogenation reactor 84, required to react hydrogen with hydrogen sulfide and sulfur dioxide, is expensive because of high initial capital cost and operating costs.

U.S. Pat. No. 5,021,232 issued to Hise et al. on Jun. 4, 1991 discloses a process for the cleanup of sulfur-containing constituents in a gaseous stream such as a tail gas from a sulfur recovery unit. A Claus reaction is used to convert sulfur-containing compounds to elemental sulfur in the presence of a stoichiometric excess of hydrogen sulfide. The elemental sulfur is separated from the tail gas and the sulfurous compounds remaining in the tail gas are separated by crystallization for recycle through the Claus process. Carbon dioxide is the crystallization material. Sulfur-containing compounds are at least partially excluded from a solid (frozen) phase of the carbon dioxide for recycling through the Claus process.

U.S. Pat. No. 5,741,469 issued to Bhore et al. on Apr. 21, 1998 discloses a process that may be used to treat Claus plant tail-gas utilizing solid oxides to remove sulfur oxides from gas streams.

U.S. Pat. App. No. US 2003/0082096, invented by Lynn and published on May 1, 2003 discloses treating sulfur dioxide-rich gas by combusting it with a substoichiometric amount of oxygen to produce a combustion gas with water vapor and sulfur vapor. The combustion gas is cooled to form water containing suspended solid sulfur and polythionic acids.

U.S. Pat. No. 6,610,264 issued to Buchanan et al. on Aug. 26, 2003 discloses a process and system for removing sulfur from tail-gas emitted from a Claus sulfur recovery process. The tail-gas is first oxidized so as to convert sulfur therein to sulfur oxides. Oxidized tail-gas is directed into an absorber where a solid absorbent absorbs substantially all the sulfur oxides thereon. After allowing sufficient time for a desired amount of sulfur oxides to be absorbed, absorption is ceased. Next, the solid absorbent containing the absorbed sulfur oxides is contacted with a reducing gas so as to release an off-gas containing hydrogen sulfide and sulfur dioxide. Upon releasing sulfur from the solid absorbent, the solid absorbent is regenerated and redirected into the absorber. Sulfur in the off-gas emitted by regeneratio is concentrated to an extent sufficient for use within a Claus sulfur recovery process for conversion to elemental sulfur.

SUMMARY OF THE INVENTION

Objects of the present invention include providing a process for treating process off-gases that:
effectively removes sulfur compounds from the gases;
handles variations and operational fluctuations in the process stream composition without upset;
eliminates the need for a hydrogenation reactor and the hydrogen supply required for such a reactor; and
reduces or eliminates the need for amine towers.

Other objects of the present invention will become evident throughout the reading of this document.

The present invention comprises a method of treating an off-gas stream from a refining process to remove sulfur compounds, including hydrogen sulfide. In the present invention, a portion of the off-gas stream containing hydrogen sulfide is injected at the front end of the thermal reactor and in at least one other location downstream of the thermal reactor. A ratio of hydrogen sulfide to sulfur dioxide at the outlet of the thermal reactor is less than the stoichiometric requirement. The ratio is adjusted downstream of the thermal reactor so that a ratio of hydrogen sulfide to sulfur dioxide is maintained substantially in excess of the stoichiometric requirement for a Claus reaction through the Claus reactors. Substantially complete reaction of all sulfur dioxide, whether initially present in process gas or generated in the thermal reactor, occurs concurrently with transmission of the process gas through the Claus reactors, such that the tail gas contains virtually no sulfur dioxide.

The tail gas, containing hydrogen sulfide but virtually no sulfur dioxide, is treated by a process including removal of water, heating the tail gas, introducing sulfur dioxide into the tail gas in a stoichiometricly balanced quantity, processing the tail gas in a Claus reactor, recovering elemental sulfur and sub-cooling the remaining tail gas to the sulfur dew-point.

In an alternative embodiment, the tail gas may be treated by a sub-dewpoint reactor intermediate the tail gas Claus reactor and the sub-cooler.

In a second alternative embodiment, the tail gas is treated as in a SCOT tail gas treatment process. However, the elimination of sulfur dioxide from the tail gas eliminates the need for a prior art hydrogenation unit.

DESCRIPTION OF THE INVENTION

Figure 1:
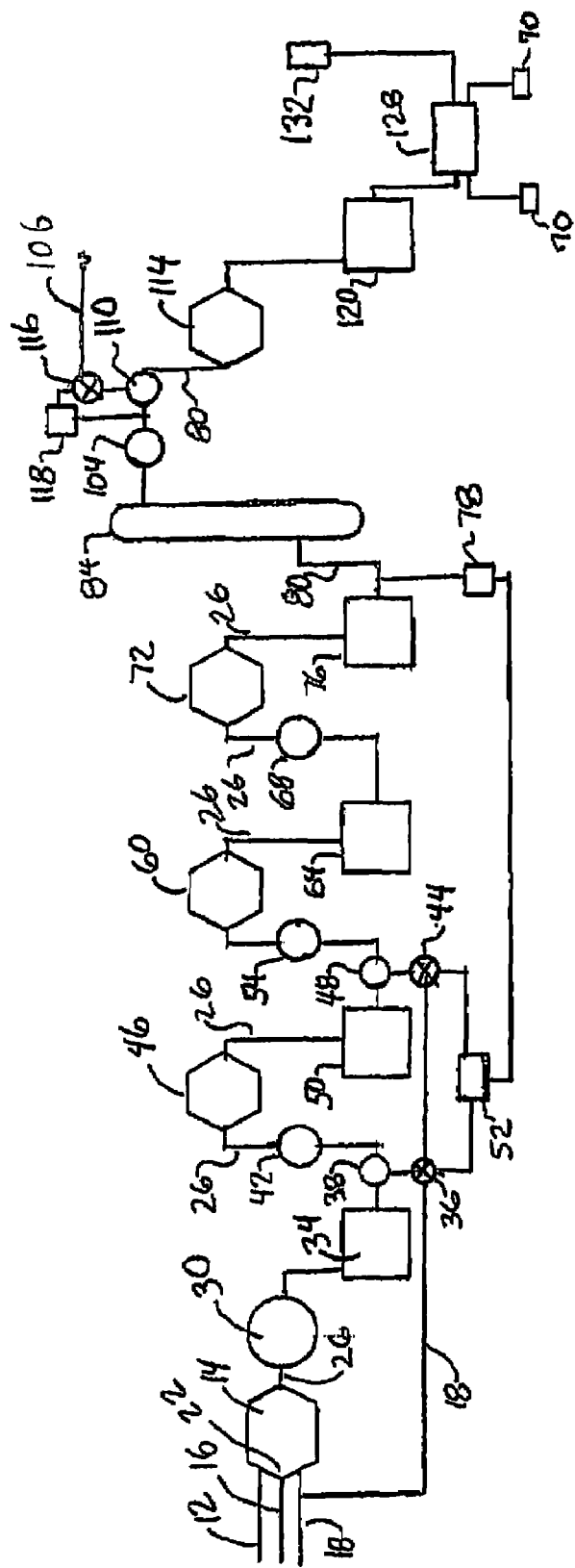
FIG. 1 is a diagram of the preferred embodiment of the process of the present invention.

Referring to FIG. 1, the preferred embodiment of the process treatment process of the present invention is depicted. An off-gas line 18 containing hydrogen sulfide as a primary sulfur-containing compound, referred to herein as hydrogen sulfide off-gas line 18, and an off-gas line 12 containing ammonia, referred to herein as the ammonia off-gas line 12, each include by-products from a primary hydrocarbon process. Off-gas lines 12 and 18 each typically also contain various quantities of water, oxygen, nitrogen, carbon dioxide, sulfur dioxide, carbon monoxide and small amounts of other hydrocarbon compounds. Compositions vary depending on the process, variation of the input stream and variations in the application of the process.

Hydrogen sulfide off-gas line 18 and ammonia off-gas line 12 are each connected to thermal reactor 14 for transmittal of respective process gases to thermal reactor 14. Air is supplied to thermal reactor 14 through air line 16 for reaction with process gases from hydrogen sulfide off-gas line 18 and ammonia off-gas line 12.

Relative quantities of air, hydrogen sulfide off-gas line 18 gases and ammonia off-gas line 12 gases introduced into reactor chamber 14 are determined to create an excess of sulfur dioxide over the stoichiometric amount of sulfur dioxide and hydrogen sulfide required pursuant to the Claus equation. Accordingly, an excess of sulfur dioxide will be result at the outlet of reactor 14.

The preferred temperature within thermal reactor 14 is at least 1,316° C. (2,400° F.) in order to oxidize or reduce various other constituents of hydrogen sulfide off-gas line 18 gases and ammonia off-gas line 12 gases.

In the preferred embodiment of the present invention, all hydrogen sulfide containing gas introduced into thermal reactor 14 through hydrogen sulfide off-gas line 18 is introduced at the front end 22 of thermal reactor 14. Hydrogen sulfide is not fed into the thermal reactor 14 after the initial introduction through first hydrogen sulfide line 18. This allows the temperature of reactor chamber 14 to remain near 1,316° C. (2,400° F.) in a greater area of the reactor chamber 14 and extends exposure time of the process gas to such temperature. Accordingly, increased oxidation or reduction of contaminants results at consistent flow rates of process gases.

After exiting reactor chamber 14, the thermally-reacted process gas is fed by gas line 26 through a waste heat boiler 30 to cool the process gas and recover thermal energy from the process gas. Process gas is then fed to first condenser 34 where the process gas is cooled to allow condensation and collection of elemental sulfur.

A second quantity of hydrogen sulfide line 18 gas is transmitted by hydrogen sulfide gas line 18 and injected into thermally-reacted gas line 26 downstream of first condenser 34 at mixer 38. The amount of hydrogen sulfide added is sufficient to create an excess of the amount hydrogen sulfide required for a stoichiometric balance with sulfur dioxide in the process gas line 26.

As the Claus reaction is exothermic, reaction of hydrogen sulfide and sulfur dioxide is readily accomplished at a wide range of temperatures and pressures. Addition of excess hydrogen sulfide at mixer 38 accordingly enhances effective Claus reaction downstream of mixer 38 and enhances sulfur dioxide removal from the gas stream.

Through control devices known in the art, the quantity of hydrogen sulfide containing process gas delivered to mixer 38 through line 24 may be adjusted. Control of flow may be accomplished by valve 36 or by a control mechanism incorporated into mixer 38. The quantity of hydrogen sulfide line 18 gas injected into thermally-reacted gas line 26 at mixer 38 may be controlled by controller 52.

A sulfur dioxide analyzer 78 determines the quantity of sulfur dioxide in tail gas line 80 upstream of quench tower 84. Such determination is input to controller 52. If input of additional hydrogen sulfide line 18 gas is required at mixer 38, controller 52 adjusts the amount of hydrogen sulfide line 18 gas input to mixer 38. Analyzer 78 and controller 52 are commercially practiced control devices.

Process gas is subsequently transmitted to reheater 42 where the process gas is heated. Process gas is then transmitted by line 26 to a first Claus reactor 46 where a catalyst, such as aluminum oxide ($Al_2O_3$) or bauxite, is utilized to catalyze reaction of hydrogen sulfide and sulfur dioxide in the process gas. Condensers such as second condenser 50, reheaters such as first reheater 42 and reactors such as first Claus reactor 46 are known in the art.

Claus reactor 46 is operated to achieve an outlet temperature greater than 315° C. (600° F.). The hydrogen sulfide off-gas of line 18 contains quantities of carbonyl sulfide (COS) and carbon disulfide ($CS_2$). Operating Claus reactor 46 at such temperature allows such compounds to be cracked during the reaction process.

Process gas is then transmitted by line 26 through second condenser 50.

A third quantity of hydrogen sulfide line 18 gas is transmitted by hydrogen sulfide gas line 18 and injected into process gas line 26 downstream of second condenser 50 at mixer 48. Control of flow may be accomplished by valve 46 or by a control mechanism incorporated into mixer 48. Process gas is then transmitted by line 26 through second reheater 54 and second Claus reactor 60.

Process gas is then transmitted by line 26 through third condenser 64, third reheater 68, third reactor 72 and fourth condenser 76. Preferably a ratio of 50 lbmol of hydrogen sulfide to 1 lbmol of carbon dioxide is provided at the inlet to third reactor 72 (25:1 ratio on a stoichiometric basis.

Condensers such as condensers 50 and 64, reheaters such as reheaters 42 and 68, and reactors such as reactors 60 and 72 are known in the art.

The excess hydrogen sulfide feed at mixer 38 and mixer 48 introduces sufficient quantities of hydrogen sulfide through hydrogen sulfide line 18 that contact of substantially all sulfur dioxide remaining in the process gases may be made within process line 26, thereby achieving substantial elimination of sulfur dioxide at the outlet of condenser 76. The quantity of sulfur dioxide in the tail gas line 80 at the outlet of condenser 76 is reduced below a level that would cause corrosion or sulfur formation in the quench tower. A desired concentration is substantially below one hundred (100) parts per million.

OPERATION EXAMPLE

In an illustrative material balance calculation, a quantity of hydrogen sulfide line 18 gas, a quantity of ammonia line 12 gas and a quantity of air line 12 gas are reacted in reactor 14 creating a process line 26 gas having a concentration of sulfur dioxide of 41.9 pound moles ("lbmols") of sulfur dioxide and of 27.5 lbmols of hydrogen sulfide at the outlet of condenser 34. This is a 0.66:1 ratio of hydrogen sulfide to sulfur dioxide on a lbmol basis and a 0.33:1 ratio on a stoichiometric basis (as 2 lbmols of hydrogen sulfide are required to each lbmol of sulfur dioxide).

A second quantity of hydrogen sulfide line 18 gas is injected at mixer 38 to provide a concentration of hydrogen sulfide of 21.7 lbmols and a concentration of sulfur dioxide of 9.4 lbmols at the outlet of condenser 50, a 2.31:1 ratio of hydrogen sulfide to sulfur dioxide on a lbmol basis and a 1.16:1 ratio on a stoichiometric basis.

A third quantity of hydrogen sulfide line 18 gas is subsequently injected at mixer 48 to provide a concentration of hydrogen sulfide of 14.4 lbmols and a concentration of sulfur dioxide of 0.34 lbmols at the outlet of condenser 64, a 48:1 ratio on a lbmol basis and a 24:1 ratio on a stoichiometric basis. In a preferred embodiment, the ratio of hydrogen sulfide to sulfur dioxide downstream of reactor 60 us at least 20:1 on a lbmol basis. This is the ratio of hydrogen sulfide to sulfur dioxide at the inlet to reactor 72. As further reaction occurs and sulfur is condensed at reactor 72, a concentration of hydrogen sulfide of 13.7 lbmols and a concentration of sulfur dioxide of 0.003 lbmols results at the outlet of condenser 76, a ratio of 4,566:1 on a lbmol basis and a ratio of 2,283:1 on a stoichiometric basis. In a preferred embodiment, the ratio of hydrogen sulfide to sulfur dioxide downstream of reactor 72 is at least 200:1 on a lbmol basis.

In such calculation, the total lbmols of all constituents of process gas at the outlet of condenser 76 is 872.6 lbmols (including 435.6 lbmols of nitrogen and 360.3 lbmols of water vapor), providing a calculated sulfur dioxide concentration of 3.4 parts per million on a lbmol basis.

In operation, sulfur dioxide levels are monitored sulfur dioxide analyzer 78 determines the quantity of sulfur dioxide in tail gas line 80 upstream of quench tower 84. Controller 52 adjusts quantities of hydrogen sulfide off-gas line 18 input to process line 26 at mixer 38 and at mixer 48 to obtain the desired concentration of sulfur dioxide at the analyzer measurement location. Such control may be exercised using defined constraints or through user input.

Liquid sulfur condensation utilizing Claus reactors may be accomplished using fewer or greater than the three series of reactors and condensers identified in FIG. 1.

Figure 2:
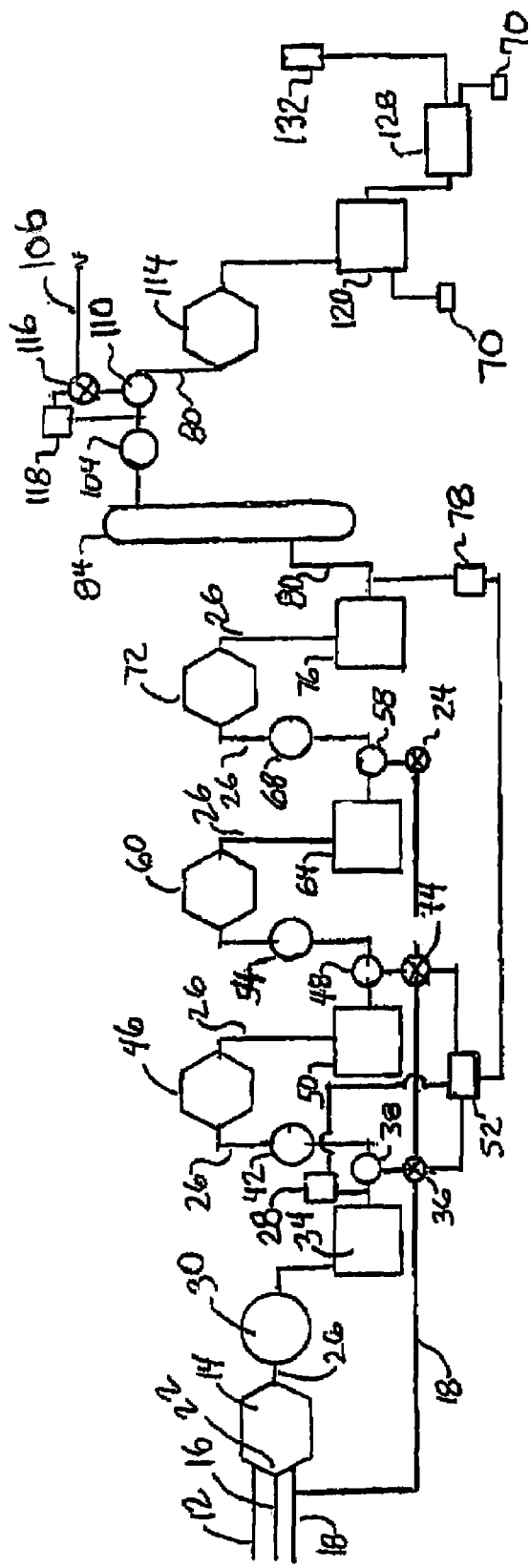
FIG. 2 is a diagram of an alternative embodiment of the process of the present invention.

Referring to FIG. 2, an alternative embodiment of the gas treatment process is shown. An additional mixer 58 is installed downstream of condenser 64 to provide an additional input source of hydrogen sulfide line 18 gas at such location. Introduction of a relatively small quantity of additional hydrogen sulfide at such location greatly impacts the ratio of hydrogen sulfide to sulfur dioxide at such location to react remaining sulfur dioxide and reduce the quantity of sulfur dioxide at the outlet of condenser 76. A fourth hydrogen sulfide line 18 gas input location is provided at mixer 58 downstream of third condenser 64. Control of flow may be accomplished by valve 24 or by a control mechanism incorporated into mixer 58. A hydrogen sulfide/sulfur dioxide analyzer 28 is provided downstream of first condenser 34. Analyzer 28 is connected to controller 52. provides additional data regarding the composition of process line 26 gas at condenser 34. Mixer 58 provides additional operational flexibility in adjusting hydrogen sulfide input.

Additional analyzers (not shown) may be utilized as desired. Placement of analyzers may be adjusted to provide information at locations deemed relevant. Mixers may be placed at alternate locations.

In a second alternative embodiment of the process gas treatment process, mixer 48 may eliminated. Adjustments to the amount hydrogen sulfide line 18 gas input to process gas line 26 are made at mixer 38.

In a third alternative embodiment of the process gas treatment process, a separate source of hydrogen sulfide may be utilized to introduce a hydrogen sulfide feed to mixer 38 in lieu of feeding a portion of the hydrogen sulfide off-gas line 18 process gas to mixer 38. Such alternative embodiment would be useful in instances wherein the hydrogen sulfide off-gas line 18 process gas contains significant quantities of other contaminants.

In a fourth alternative embodiment of the process gas treatment process, mixer 38 is placed downstream of thermal reactor 14 and upstream of condenser 34 to increase dwell time of excess hydrogen sulfide in the process gas stream.

Tail Gas Treatment—Sulfur Dioxide Addition

The process gases remaining after removal of elemental sulfur, which are now referred to as the "tail gas," are transmitted from condenser 76 by tail gas line 80 to a quench tower 84 to remove water vapor from the tail gas. Quench towers, such as quench tower 84, are known in the art and are commonly used for removal of water vapor from the tail gas. Water is known to inhibit Claus reactions, so it is advantageous to remove water vapor from the tail gas prior to a Claus reaction to be subsequently initiated.

The tail gas is then heated at heater 104 to achieve a temperature in the range of 149 to 260° C. (300 to 500° F.). A quantity of sulfur dioxide is added to the tail gas from sulfur dioxide line 106 at valve 110 such that a stoichiometric ratio of sulfur dioxide and hydrogen sulfide is obtained to achieve a Claus reaction. The amount of sulfur dioxide to be added is determined by an analyzer 118 upstream of valve 110. Analyzer 118 monitors the quantity of hydrogen sulfide in the tail gas line 80 and through valve control devices known in the art adjusts the quantity of sulfur dioxide added to tail gas line 80.

Addition of sulfur dioxide to the tail gas creates an additional Claus reaction with the hydrogen sulfide remaining in the tail gas.

The tail gas is then transmitted to a Claus reactor 114 having a catalyst bed of aluminum oxide or bauxite and subsequently to a condenser 120.

Remaining tail gas is then transmitted to a subcooler 128 where the tail gas is further cooled preferably to a temperature of 66° C. (150° F.). At subcooler 128, the Claus reaction continues and sulfur continues to condense.

Liquid sulfur is continuously collected at a sulfur trap 70 at condenser 120 and a sulfur trap 70 at subcooler 128.

Tail gas remaining at the output of subcooler 128 contains less than 150 parts per million of hydrogen sulfide and sulfur dioxide and may be burned to atmosphere at burner 132.

Figure 3:
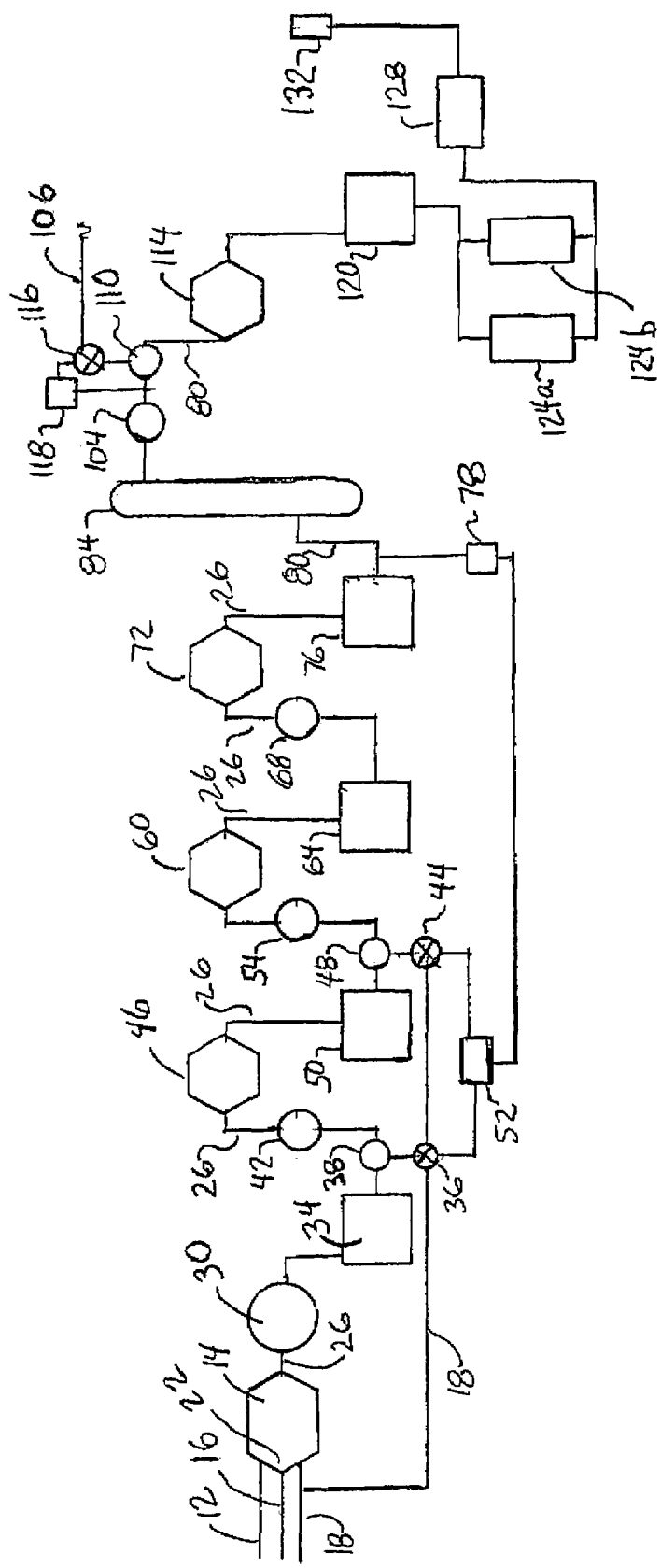
FIG. 3 is a diagram of an alternative embodiment of the process of the present invention incorporating a sub-dew-point reactor.

Referring to FIG. 3, an alternative embodiment of the tail gas treatment process provides a subdewpoint reactor system 124 for treatment of tail gas remaining after condenser 120. The subdewpoint reactor system 124 includes at least one pair of subdewpoint reactors, reactor 124a and 124b. Tail gas is transmitted to subdewpoint catalyst bed 124a. Catalyst bed 124a is a catalyst bed utilizing aluminum oxide ($Al_2O_3$) or bauxite as a catalyst for a Claus reaction. Catalyst bed 124a operates effectively when the temperature of the tail gas is around 260° F. Catalyst bed 124a and the condensing process are known in the art. As is known in the art, catalyst bed 124a is porous and subject to saturation as sulfur condenses from tail gas onto catalyst bed 124a. Upon saturation of the catalyst bed 124a, flow of tail gas is redirected to subdewpoint catalyst bed 124b. Catalyst bed 124b is like catalyst bed 124a and likewise is subject to condensation of sulfur and saturation.

Upon redirection of tail gas to catalyst bed 124b, the sulfur may be cleaned from catalyst bed 124a. In like manner, upon saturation of catalyst bed 124b with sulfur, tail gas may be redirected to catalyst bed 124a and catalyst bed 124b may be cleaned. Such process of cleaning catalyst beds is known and practiced in the art.

In the alternative embodiment of FIG. 3, tail gas remaining after subdewpoint reactor system 124 is transmitted to subcooler 128 where the tail gas is further cooled preferably to a temperature of 66° C. (150° F.). Tail gas remaining at the output of subcooler 128 may be burned to atmosphere at burner 132.

Modified SCOT Process.

Figure 4:
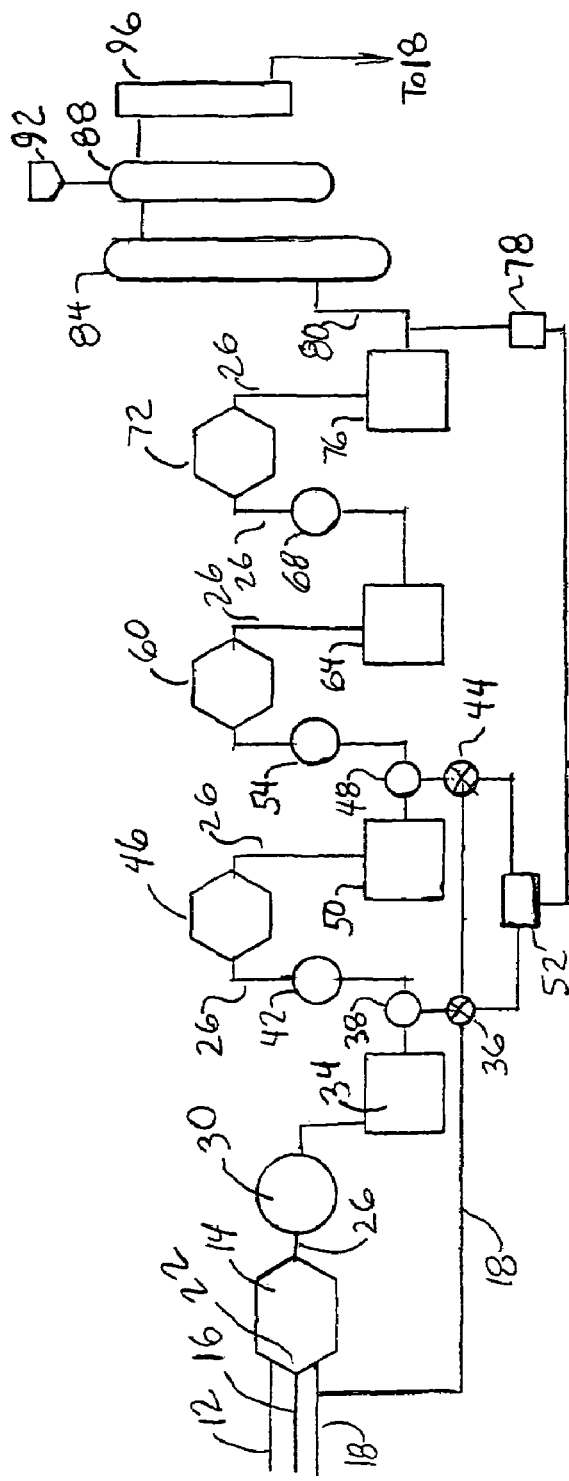
FIG. 4 is a diagram an alternative embodiment of the present invention depicting a modified SCOT tail gas treatment process.
Figure 5:
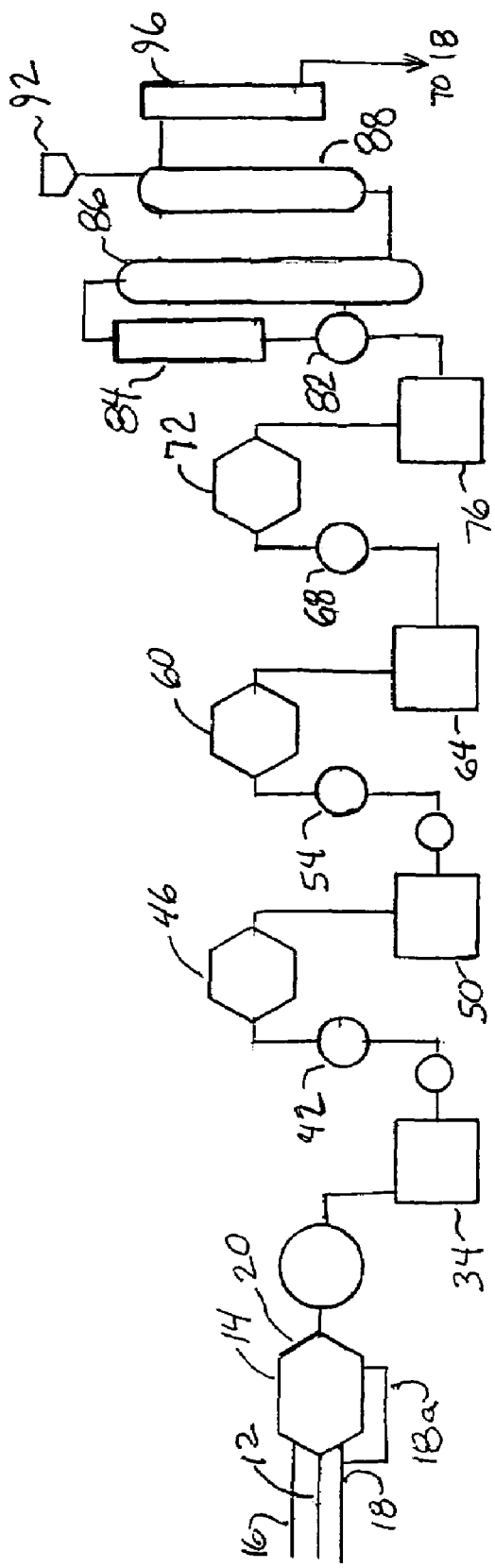
FIG. 5 is a diagram of a prior art process treating system with a SCOT tail gas treatment process.

Referring to FIG. 4, an alternative embodiment of the tail gas process comprises a modification to the Shell Claus Off-gas Treatment Process. In such alternative embodiment, the process gases remaining after condenser 76, which are now referred to as the "tail gas," are transmitted from condenser 76 by tail gas line 80 to a quench tower 84 to eliminate water vapor from the tail gas. Quench towers, such as quench tower 84, are known in the art and are commonly used for removal of water vapor from the tail gas.

The tail gas from quench tower 84 is transmitted to an amine tower 88. In amine tower 88, hydrogen sulfide is absorbed by an amine solution contacting the tail gas. The remaining tail gas contains sufficiently reduced quantities of sulfur dioxide that the remaining tail gas may be burned to the atmosphere at burner 92.

The amine and hydrogen sulfide solution from amine tower 88 is transmitted to an amine regenerator 96. At amine regenerator 96, hydrogen sulfide is stripped from the amine. Hydrogen sulfide from the amine regenerator is transmitted by hydrogen sulfide feed line 18 to thermal reactor 14.

Amine towers, such as amine tower 88, and amine regenerators, such as amine regenerator 92, are commonly practiced in the art.

It is noted that the tail gas treatment of the present invention eliminates the expensive hydrogenation step of the prior art SCOT tail gas treatment process as the quantity of sulfur dioxide in the tail gas line 80 at the outlet of condenser 76 is reduced below a level that would cause corrosion or sulfur formation in the quench tower. This embodiment allows practice of the process of the present invention in plants having existing SCOT tail gas treatment facilities in place, but at reduced operation costs.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A process for removing sulfur compounds from a hydrogen sulfide off-gas containing hydrogen sulfide and other sulfur compounds and for removing nitrogen compounds from an ammonia off-gas containing ammonia and other nitrogen compounds, comprising:

a thermal reaction step comprising combusting in a thermal reactor a first quantity of said hydrogen sulfide off-gas, a quantity of said ammonia off-gas and air to produce a process gas;

a second hydrogen sulfide step comprising introducing into said process gas a second quantity of said hydrogen sulfide off-gas;

a sulfur reaction and condensation process step comprising treating said process gas to condense sulfur from said process gas;

a water vapor removal step for removing water vapor from the remaining process gas;

a tail gas heating step for heating said remaining process gas;

a sulfur dioxide addition step for adding sulfur dioxide to said remaining process gas; and a sulfur reaction step for generating sulfur from said remaining process gas;

a tail gas cooling step to cool the remaining process gas; and a tail gas condensation step to condense sulfur from the remaining process gas.

2. A process as in claim 1 wherein:

said thermal reaction step producing a process gas containing a quantity of hydrogen sulfide less than the quantity of hydrogen sulfide required for a stoichiometric reaction with sulfur dioxide in said process gas.

3. A process as in claim 1 wherein:

said second hydrogen sulfide step comprising providing sufficient hydrogen sulfide off-gas for an excess of hydrogen sulfide over the amount of hydrogen sulfide required for a stoichiometric reaction with sulfur dioxide in said process gas.

4. A process as in claim 2 wherein:

said second hydrogen sulfide step comprising providing sufficient hydrogen sulfide off-gas for an excess of hydrogen sulfide over the amount of hydrogen sulfide required for a stoichiometric reaction with sulfur dioxide in said process gas.

5. A process as in claim 1 further comprising:

said sulfur reaction and condensation process step comprising a first reactor operated at an outlet temperature of at least 315° C. (600° F.).

6. A process as in claim 4 further comprising:

a sulfur condensing step intermediate said thermal reaction step and said second hydrogen sulfide step.

7. A process as in claim 1 further comprising:

a first control step comprising analyzing quantities of sulfur dioxide downstream of said sulfur reaction and condensation process step, and controlling quantities of hydrogen sulfide off-gas provided to said process gas at said second hydrogen sulfide step.

8. A process as in claim 7 further comprising:

said sulfur reaction and condensation process step comprising a plurality of Claus reactors to condense elemental sulfur from the process gas.

a third hydrogen sulfide step comprising introducing into said process gas downstream of a first Claus reactor a third quantity of said hydrogen sulfide off-gas.

9. A process as in claim 8 further comprising:

said first control step including controlling quantities of hydrogen sulfide off-gas provided to said process gas at said third hydrogen sulfide step.

10. A process as in claim 9 further comprising:

a fourth hydrogen sulfide step comprising introducing into said process gas downstream of a second Claus reactor a fourth quantity of said hydrogen sulfide off-gas.

11. A process as in claim 10 further comprising:

said first control step including controlling quantities of hydrogen sulfide off-gas provided to said process gas at said fourth hydrogen sulfide step.

12. A process as in claim 7 wherein:

said sulfur reaction and condensation process step comprising a plurality of Claus reactors to remove elemental sulfur from the process gas, said first control step further comprising analyzing quantities of hydrogen sulfide and sulfur dioxide intermediate said thermal reaction step and the last Claus reactor of said plurality of Claus reactors.

13. A process as in claim 8 wherein:

said first control step further comprising analyzing quantities of sulfur dioxide and hydrogen sulfide downstream from said second hydrogen sulfide step, and controlling quantities of hydrogen sulfide off-gas provided to said process gas at said third hydrogen sulfide step.

14. A process as in claim 1 further comprising:

a sulfur dioxide control step, comprising analyzing quantities of sulfur dioxide and hydrogen sulfide downstream of said water vapor removal step and controlling quantities of sulfur dioxide to be mixed with said process gas at said sulfur dioxide addition step.

15. A process as in claim 4 further comprising:

a sulfur dioxide control step, comprising analyzing quantities of sulfur dioxide and hydrogen sulfide downstream of said water vapor removal step and controlling quantities of sulfur dioxide to be mixed with said process gas at said sulfur dioxide addition step.

16. A process as in claim 1 further comprising:

a subdewpoint reaction step intermediate said tail gas cooling step and said tail gas condensation step.

17. A process as in claim 4 further comprising:

a subdewpoint reaction step intermediate said tail gas cooling step and said tail gas condensation step.

18. A process as in claim 7 further comprising:

said sulfur reaction and condensation process step comprising at least three Claus reactors;

said first control step operated to produce a ratio of hydrogen sulfide to sulfur dioxide of at least 20:1 on a pound mole basis at the outlet of the second of said at least three Claus reactors.

19. A process as in claim 7 further comprising:

said sulfur reaction and condensation process step comprising at least three Claus reactors;

said first control step operated to produce a ratio of hydrogen sulfide to sulfur dioxide of at least 200:1 on a pound mole basis at the outlet of the third of said at least three Claus reactors.

20. A process as in claim 8 wherein:

said third hydrogen sulfide step comprising providing sufficient hydrogen sulfide gas from a source other than said hydrogen sulfide off-gas.

21. A process as in claim 10 further wherein:

said fourth hydrogen sulfide step comprising providing sufficient hydrogen sulfide gas from a source other than said hydrogen sulfide off-gas.

22. A process for removing sulfur compounds from a hydrogen sulfide off-gas containing hydrogen sulfide and other sulfur compounds and for removing nitrogen compounds from an ammonia off-gas containing ammonia and other nitrogen compounds, comprising:

a thermal reaction step comprising combusting in a thermal reactor a first quantity of said hydrogen sulfide off-gas, a quantity of said ammonia off-gas and air to produce a process gas;

a sulfur condensing step;

a second hydrogen sulfide step comprising introducing into said process gas a second quantity of said hydrogen sulfide off-gas;
a sulfur reaction and condensation process step;
a third hydrogen sulfide step comprising introducing into said process gas within said sulfur reaction and condensation process step a third quantity of said hydrogen sulfide off-gas;
a water vapor removal step for removing water vapor from the remaining process gas;
an amine absorption step for absorbing hydrogen sulfide in an amine solution; and
an amine regeneration step for stripping hydrogen sulfide from said amine solution.

23. A process as in claim 22 wherein:
said thermal reaction step producing a process gas containing a quantity of hydrogen sulfide less than the quantity of hydrogen sulfide required for a stoichiometric reaction with sulfur dioxide in said process gas.

24. A process as in claim 23 wherein:
said second hydrogen sulfide step comprising providing sufficient hydrogen sulfide off-gas for an excess of hydrogen sulfide over the amount of hydrogen sulfide required for a stoichiometric reaction with sulfur dioxide in said process gas.

25. A process as in claim 23 further comprising:
a sulfur condensing step intermediate said thermal reaction step and said second hydrogen sulfide step; and
a hydrogen sulfide return step for transmitting remaining hydrogen sulfide from said amine regeneration step to said thermal reaction step.

26. A process as in claim 22 further comprising:
a first control step comprising analyzing quantities of sulfur dioxide downstream of said sulfur reaction and condensation process step, and controlling quantities of hydrogen sulfide off-gas provided to said process gas at said second hydrogen sulfide step.

27. A process as in claim 26 further comprising:
said sulfur reaction and condensation process step comprising a plurality of Claus reactors to condense elemental sulfur from the process gas; and
wherein said third hydrogen sulfide step comprises introducing into said process gas downstream of a first Claus reactor said third quantity of said hydrogen sulfide off-gas.

28. A process as in claim 27 further comprising:
said first control step including controlling quantities of hydrogen sulfide off-gas provided to said process gas at said third hydrogen sulfide step.

29. A process as in claim 28 further comprising:
a fourth hydrogen sulfide step comprising introducing into said process gas downstream of a second Claus reactor a fourth quantity of said hydrogen sulfide off-gas.

30. A process as in claim 29 further comprising:
said first control step including controlling quantities of hydrogen sulfide off-gas provided to said process gas at said fourth hydrogen sulfide step.

31. A process as in claim 26 wherein:
said sulfur reaction and condensation process step comprising a plurality of Claus reactors to remove elemental sulfur from the process gas,
said first control step further comprising analyzing quantities of hydrogen sulfide and sulfur dioxide intermediate said thermal reaction step and the last Claus reactor of said plurality of Claus reactors.

32. A process as in claim 28 wherein:
said first control step further comprising analyzing quantities of sulfur dioxide and hydrogen sulfide downstream from said second hydrogen sulfide step, and controlling quantities of hydrogen sulfide off-gas provided to said process gas at said third hydrogen sulfide step.

33. A process as in claim 26 further comprising:
said sulfur reaction and condensation process step comprising at least three Claus reactors;
said first control step operated to produce a ratio of hydrogen sulfide to sulfur dioxide of at least 20:1 on a pound mole basis at the outlet of the second of said at least three Claus reactors.

34. A process as in claim 26 further comprising:
said sulfur reaction and condensation process step comprising at least three Claus reactors;
said first control step operated to produce a ratio of hydrogen sulfide to sulfur dioxide of at least 200:1 on a pound mole basis at the outlet of the third of said at least three Claus reactors.

35. A process as in claim 27 wherein:
said third hydrogen sulfide step comprising providing sufficient hydrogen sulfide gas from a source other than said hydrogen sulfide off-gas.

36. A process as in claim 29 further wherein:
said fourth hydrogen sulfide step comprising providing sufficient hydrogen sulfide gas from a source other than said hydrogen sulfide off-gas.

* * * * *